United States Patent
Schmidt et al.

(10) Patent No.: US 10,768,703 B2
(45) Date of Patent: Sep. 8, 2020

(54) OPERATING UNIT MOUNT WITH IMPROVED LEAF SPRING ELEMENT ATTACHMENT

(71) Applicant: PREH GMBH, Bad Neustadt a. d. Saale (DE)

(72) Inventors: Benedikt Schmidt, Bad Neustadt a. d. Saale (DE); Kai Lang, Bastheim (DE); Mario Schmitt, Salz (DE)

(73) Assignee: PREH GMBH, Bad Neustadt A. D. Saale (DE)

( * ) Notice: Subject to any disclaimer, the term of this patent is extended or adjusted under 35 U.S.C. 154(b) by 158 days.

(21) Appl. No.: 15/913,593

(22) Filed: Mar. 6, 2018

(65) Prior Publication Data

US 2018/0260027 A1 Sep. 13, 2018

(30) Foreign Application Priority Data

Mar. 9, 2017 (DE) .................. 10 2017 104 979

(51) Int. Cl.
*G06F 3/01* (2006.01)
*B60R 11/02* (2006.01)
(Continued)

(52) U.S. Cl.
CPC .......... *G06F 3/016* (2013.01); *B60R 11/0264* (2013.01); *F16F 3/023* (2013.01);
(Continued)

(58) Field of Classification Search
CPC combination set(s) only.
See application file for complete search history.

(56) References Cited

U.S. PATENT DOCUMENTS

| 5,114,095 A * | 5/1992 | Schroppel | ............... F42B 10/20 244/3.28 |
| 2003/0156919 A1 * | 8/2003 | Schwarz | ............... F16B 37/045 411/349 |

(Continued)

FOREIGN PATENT DOCUMENTS

DE 102015008763 A1 1/2017

OTHER PUBLICATIONS

Motor vehicle-Operating device with zero-lie-adjusted operating part Wachinger, Michael DE 102015008763 A1. (Published Jan. 12, 2017) (Year: 2017) (Year: 2017).*

(Continued)

*Primary Examiner* — Van N Chow
(74) *Attorney, Agent, or Firm* — M&B IP Analysts, LLC

(57) ABSTRACT

The present disclosure is a touch-sensitive input detector having an operating unit with an input surface; a support; a fastener for mounting the operating unit to the support in a vibration direction so as to be displaceable from a resting position and elastically restorable; and an actuator for stimulating the operating unit to vibrate in the direction of vibration for a haptic feedback; wherein the fastener for attaching the operating unit includes leaf spring elements, which each form a first section for attaching to the support and a second section for attaching to the operating unit, and an intermediate middle section, so that the operating unit is mounted on the support in an elastically vibratable manner, and which are arranged at a distance from each other by the middle section, wherein at least one section from first section and second section is attached by a form-fit seat, such as overmolding.

13 Claims, 5 Drawing Sheets

(51) Int. Cl.
*G06F 3/044* (2006.01)
*F16F 3/02* (2006.01)
*G06F 3/041* (2006.01)

(52) U.S. Cl.
CPC .............. *G06F 3/041* (2013.01); *G06F 3/044* (2013.01); *F16F 2230/0005* (2013.01); *F16F 2230/18* (2013.01)

(56) References Cited

U.S. PATENT DOCUMENTS

| | | | | |
|---|---|---|---|---|
| 2007/0034769 | A1* | 2/2007 | Kwilosz | B60R 16/0215 |
| | | | | 248/565 |
| 2010/0277013 | A1* | 11/2010 | Jungnickel | A61C 17/3418 |
| | | | | 310/37 |
| 2018/0190449 | A1* | 7/2018 | Lisseman | H01H 13/85 |

OTHER PUBLICATIONS

Fuchs, "Advantages of Hybrid Die Casting Injection Molding Components", Switzerland, 2011, pp. 78-82.

\* cited by examiner

OPERATING UNIT MOUNT WITH IMPROVED LEAF SPRING ELEMENT ATTACHMENT

This application claims priority to the German Application No. 10 2017 104 979.7, filed Mar. 9, 2017, now pending, the contents of which are hereby incorporated by reference.

The present disclosure relates to a touch-sensitive input device with an operating unit that is mounted on a support so as to be vibratable by means of an actuator. While touching, the vibration is palpable to the user and accordingly serves to generate haptic feedback during input. Such a procedure is known from the prior art. Various vibration directions for this vibration are known, such as presented in US 2008055277 A1. Various concepts are also known with regard to the actuator—preferably, the electrically-operated actuator—such as piezoelectric excitation.

The present disclosure addresses the problem of the "floating" and restorable mounting of the operating unit. The aim here is an as low-friction, low-wear, and vandalism-resistant mounting as possible, such that the resting position of the operating unit can be reliably sustained. Particularly with a motor vehicle, the goal is to prevent gap dimensions of gaps in the operating unit from increasing over the course of use that, given relative movement, must be provided because of the design. This is not only visually problematic; it also entails the risk that this gap can no longer be reliably sealed—at least over time.

In addition, there is a need for such a mounting of the operating unit, where a restorable change in position in the direction parallel to the touch-sensitive input surface of the operating unit is reliably and, above all, reproducibly assumed and sustained after installation, so that time-consuming adjustments can be dispensed with. Moreover, the restoring effect must be long-lasting and unchanging, so that the vibration excited by the actuator during operation does not have to be readjusted.

In general, significant demands are placed on the mounting of the operating unit—in particular, when the direction of the impact or excitement of vibration initiated by the actuator does not correspond with the direction of the actuating force applied by touching—in particular, when both directions are orthogonal to each other.

Against this backdrop, the aim of the present disclosure is to provide an improved input device with regard to mounting—in particular, to minimize effort on its installation and adjustment. This aim is achieved by an input device of claim 1. A correspondingly advantageous motor vehicle, as well as an associated installation method, are the subject matter of the independent claims. Advantageous embodiments are the subject matter of the dependent claims. It should be noted that the characteristics stated separately in the patent claims may be combined in any technologically sensible manner and disclose further embodiments of the present disclosure. The description—in particular, in association with the figures—further characterizes and specifies the present disclosure.

The present disclosure relates to an input device. The input device according to the present disclosure has an operating unit—in particular, a touchpad. The operating unit has an input surface—in particular, a touch-sensitive input surface. The term, "touchpad" within the meaning of the present disclosure should be interpreted broadly and relates to any touch-sensitive input device in which a touch of an input surface is detected with local resolution. Preferably, a touchpad is provided, in order to, for example, effect an input such as controlling a cursor on a display corresponding to a touch sequence.

According to the present disclosure, the touchpad can define part of a combination of display surface and touch-sensitive input surface ("touchscreen"), or a displayless, i.e., exclusively touch-sensitive, input surface. The touch coordinates, or their progressions, are, for example, determined capacitively, resistively, or optically.

The term, "operating unit" moreover, comprises, for example, a base supporting, and thus securely connected to, the touch-sensitive input surface or the touchpad. The base is, for example, produced from a molding compound, e.g., a thermoset or thermoplastic, in a molding method such as an injection molding method.

The input device according to the present disclosure has a support on which the operating unit or touchpad is movably mounted. The input device according to the present disclosure moreover comprises a means for attaching the operating unit to the support, in order to displace the operating unit in a direction of vibration out of a resting position, and to elastically restore it to the resting position. Preferably, the direction of vibration is oriented parallel to the input surface.

Expressed otherwise, a movement of the operating part is enabled, including its optionally provided base, out of, or preferably around, the resting position.

To detect an actuating force acting on the input surface, a force sensor is provided, such as a capacitive force sensor, according to one embodiment. For example, a haptic feedback generated by the actuator is triggered when a given actuating force is exceeded. For example, the force sensor is arranged between the support and a housing on which the support is mounted in an elastically yielding or movable manner.

According to the present disclosure, an actuator is, moreover, provided, to excite the operating unit to vibrate in the direction of vibration, and thus to generate a haptic feedback in said direction of vibration. Preferably, it is an electrically actuated actuator. More preferably, an electromagnetic actuator is provided that comprises an armature and an electric coil that interacts electromagnetically with the armature.

According to the present disclosure, the means for attaching the operating unit comprises several, e.g., four, leaf spring elements. The leaf spring elements are designed identically. These are furthermore preferably made of spring steel, e.g., in a stamping step. Each leaf spring element has a first section for attaching to the support and a second section for attaching to the operating unit—for example, its base. Each leaf spring element further forms a middle section provided between the first and second sections so that the support and operating unit are arranged relative to each other in an elastically vibratable manner, and are spaced apart by the middle section functioning as a "bending bar." The term, "middle section," is therefore to represent the part of the leaf spring elements that, due to its elastic deformation, ensures the restoring and relative movement between the first and second sections, and thus between operating unit and support. The main surfaces of the middle sections are oriented substantially perpendicularly to the direction of vibration and, in comparison to their flexibility in the direction of vibration, manifest a strong rigidity, under pressure and traction, in a longitudinal direction.

According to the present disclosure, it is provided that at least one section from the first and second sections be attached by a form-fit seat, such as overmolding. By means of the form-fit seat—in particular, by overmolding—a secure and tight attachment is achieved, so that, overall, highly accurate installation results. Readjustment steps can thus be omitted. Preferably, the form-fit seat is provided between the operating unit—in particular, the base—and the leaf spring element, i.e., the first section.

Accordingly, a return to the resting position of the leaf spring element, and thus of the operating unit, relative to the support, is effected primarily by the middle section.

A frequently used method in the production of molded parts is the overmolding of components, such as the leaf spring elements in this case, wherein the fully-formed molded part is also termed a composite part. By overmolding, precise positioning accuracy of the spring element in the composite part is achieved, and, ultimately, precise functioning of the input device.

When overmolding components such as leaf spring elements, they are inserted in the so-called mold cavity defined by the injection mold. The injection mold that is responsible for receiving and distributing the molding compound and shaping the composite part comprises a nozzle side and an ejector side that are separated by a parting plane. With the assistance of the injection molding machine nozzle, the molding compound is injected through a sprue bush into the injection mold and is distributed in the mold cavity in which are located the leaf spring elements. By means of this procedure, a composite part comprising the overmolded leaf spring elements is produced that issues from the ejector side of the injection mold. When overmolding a component such as the leaf spring element in a mold cavity, it must be fixed in the cavity, which is generally accomplished with projecting retaining lugs or pins that normally abut the subsequent outer contour.

According to a preferred embodiment, the section, accommodated by overmolding, from the first and second sections, is provided with apertures so that, permeated by the molding compound, they cause the section to be additionally secured.

Preferably, the first section, second section, and middle section of the leaf spring element are arranged in a common plane when the operating unit is in the resting position, i.e., in the non-displaced position of the operating unit.

Preferably, the first section and the second section are each arranged in a plane perpendicular to the touch-sensitive input surface.

Preferably, the leaf spring elements, i.e., all provided leaf spring elements, are aligned parallel to each other.

For example, an attachment of the operating unit, supported on the support via upright leaf spring elements, is provided such that these are subjected to pressure under the effect of an actuation force. According to a preferred variant of the input device, it is provided that the operating unit be mounted on the support so as to be suspended via the leaf spring elements. This enables a return to the resting position supported by gravity.

Preferably, at least one section from the first and second sections is attached by a click-in seat. Preferably, the second section is snapped into the support. Preferably, the second section has a click-in opening in which a support-side, click-in lug engages in order to hold the leaf spring element on the support.

In another embodiment, the first section and/or second section extends through an associated aperture of the support, e.g., a printed circuit board belonging to the support, or an associated aperture in the operating unit, wherein the relevant section is held in the aperture. For example, the relevant section is secured by latching, or by twisting, or by rotating in the aperture and is thereby secured against removal.

Preferably, at least two leaf spring elements are integrally formed. This facilitates the process of overmolding—in particular, setting up the injection mold—such as introducing and positioning the leaf spring elements in the mold cavity defined by the injection mold.

Preferably, the two integrally-formed leaf spring elements are designed in the shape of a frame, and the first sections and second sections are each connected by connection sections.

According to another preferred embodiment, the two integrally-formed leaf spring elements are designed so that the associated middle sections, in the resting position, are arranged on a common imaginary line. For example, the two integrally-formed leaf springs are designed to be substantially strip-shaped and, in addition to the middle sections, the first sections and/or second sections are, moreover, also arranged on the imaginary line.

For example, the first sections are each provided, terminally, on the outer ends of the integrally-formed leaf spring elements, whereas the second section is designed in the middle, or vice versa. Installation space can be spared with this design. For example, the aforementioned line extends parallel to the plane defined by the input surface. For example, a combination of two different, integrally-formed leaf spring elements is provided, wherein one outer leaf spring element has first sections, and one outer leaf spring element has second sections.

Preferably, the actuator has an electrical coil and an actuator that interacts electromagnetically with the electrical coil, and the actuator is accommodated in the operating unit in a form-fit, e.g., by overmolding. This can increase the positioning accuracy of the actuator—in particular, with respect to its relative arrangement to the leaf spring elements. For example, the actuator is positioned together with the leaf spring elements in the mold cavity and overmolded with molding compound to obtain the composite part forming the base. Ultimately, a given vibration behavior thus results more reliably when generating haptic feedback; compensations by readjustments for variations in production runs can thus be omitted. The production quality can be enhanced.

According to another embodiment, the input device had a force sensor, such as a force sensor that capacitively or inductively detects force. This is designed to detect an actuating force acting on the input surface. This embodiment provides that at least one leaf spring element—preferably, all leaf spring elements—be supported on the support or operating unit via a foot, made of elastic material, adjoining the first section or second section. Preferably, the foot is always arranged between the leaf spring element and the support. The force sensor is designed and arranged to detect an elastic deformation of the foot caused by the actuating force. For example, the foot is designed like a yoke and is arranged to overlap the force sensor. The force sensor is arranged in the flow of force of the actuating force.

The present disclosure moreover relates to a method for installing an input device in one of the above-described embodiments, wherein the method comprises: providing an operating unit having an input surface, providing a support, and providing means for attaching the operating unit to the support in order to mount the operating unit in a vibration direction so as to be displaceable from a resting position and elastically restorable—preferably, in a direction parallel to the input surface. The means for attaching the operating unit comprise several leaf spring elements, which each form a first section for attaching to the support and a second section for attaching to the operating unit, and an intermediate middle section, so that the operating unit is mounted on the support in an elastically vibratable manner, and which are arranged at a distance from each other by the middle section. Moreover, an actuator is provided for stimulating the operating unit to vibrate in the direction of vibration, for a haptic feedback.

In providing this, one or more steps of overmolding are envisioned in which a base belonging to the operating unit is created by overmolding the leaf spring elements with molding compound, so that the second section is attached to the operating unit by a form-fit seat, and/or the support is created by overmolding the leaf spring elements with molding compound, so that the first section is attached to the support by the form-fit seat.

According to a preferred variant of the method, the armature belonging to the actuator is, further, overmolded with molding compound in the overmolding step. This can increase the positioning accuracy of the actuator—in particular, with respect to its relative arrangement to the leaf spring elements. Ultimately, a given vibration behavior thus results more reliably; compensations by readjustments for variations in production runs can thus be omitted. The production quality can be enhanced.

The present disclosure furthermore relates to a motor vehicle that has a touch-sensitive input device in one of the advantageous embodiments described above and below.

The present disclosure, as well as the technical setting, will be further explained below with reference to the figures. It should be noted that the figures show a particularly preferred embodiment variant of the present disclosure, which is, however, not restricted thereto. Schematically:

Figure 1:
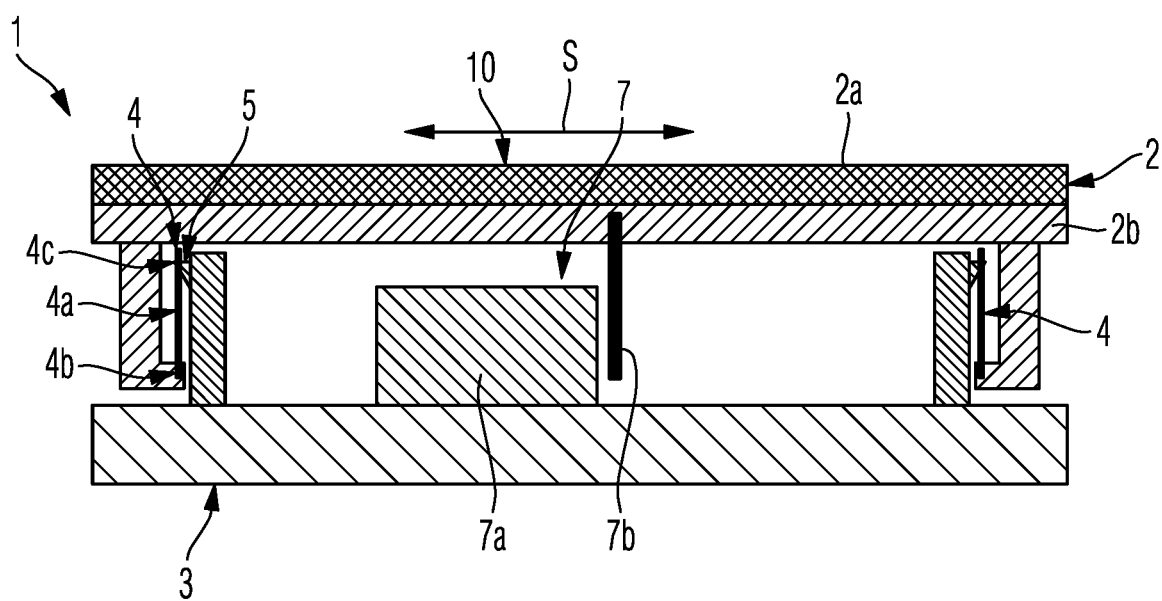
FIG. 1 shows a schematic sectional view of an embodiment of the input device 1 according to the present disclosure.

FIG. 1 shows a first embodiment of the input device 1 according to the present disclosure. It has an operating unit 2 that comprises a base 2b and a touchpad 2a attached to the base 2b. The touchpad 2a defines a touch-sensitive input surface 10 that faces the user (not shown) so that he can make entries on the touch-sensitive input surface 10 through manual touch.

The operating unit 2 can be displaced in a vibration direction S from the resting position shown in FIG. 1 and is mounted in an elastically restorable manner, wherein an attachment of the operating unit 2 suspended via the leaf spring elements 4 is provided. The vibrating and elastically restorable attachment is provided in order to permit vibration to be excited by the actuator 7, for haptic feedback to the user. The actuator 7 comprises an electric coil 7a attached to the support 3 and an armature 7b that magnetically interacts with the coil 7a and is attached to the operating unit 2. The vibrating, restorable mounting is achieved by the several leaf spring elements 4 that consist of stamped spring steel sheet and are arranged parallel to each other. The leaf spring elements 4 as well as the armature 7b are attached to the operating unit 2 by overmolding, in that the base 2b was produced in a molding method by overmolding the leaf spring elements 4, which are arranged in an associated mold cavity of an injection mold, and the armature was produced as a composite part. The second section 4b of the leaf spring element 4 provided for connecting to the operating unit 2 is thereby attached to the operating unit 2 in each case by a form-fit seat, whereas the first section 4c provided for attaching to the support 3 is secured thereto by latching means 5. The latching means 5 are designed as a support-side, click-in lug that engages in an aperture in the leaf spring element 4—in particular, in the first section 4c. The first section 4c and second section 4b are connected by a middle section 4a, and all three sections are arranged in the resting position in a common plane that is orthogonal to the input surface 10.

Figure 2:
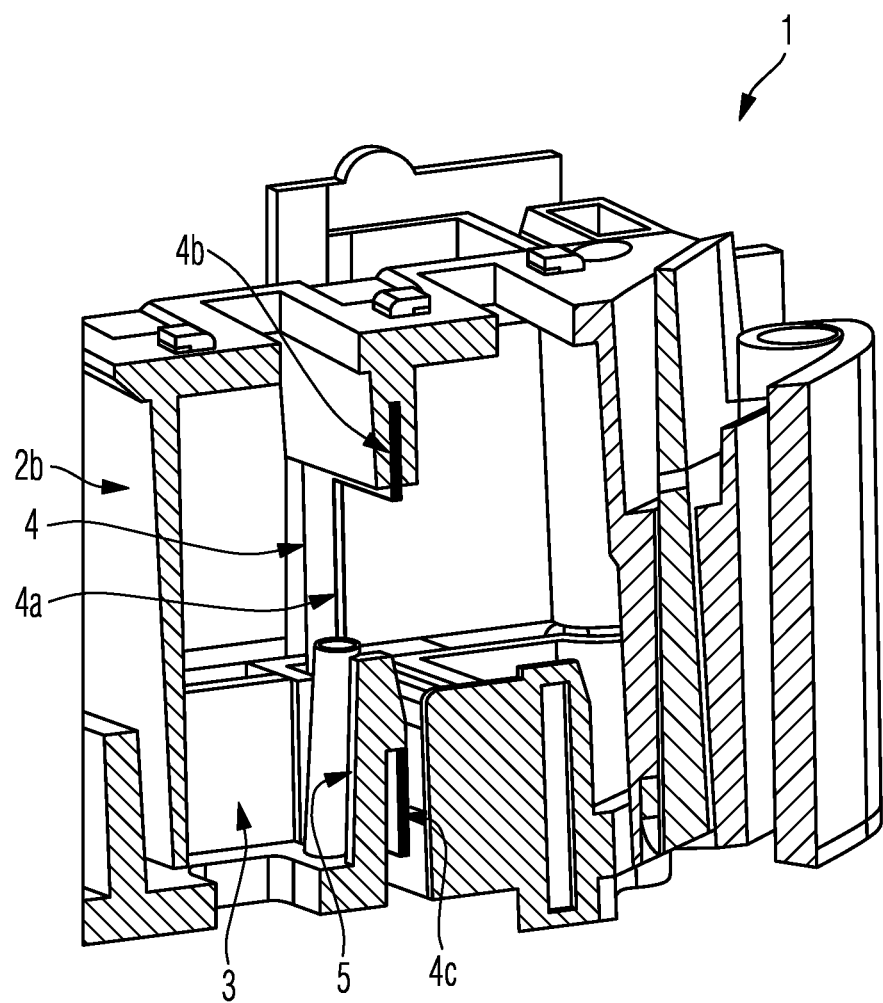
FIG. 2 shows a detailed sectional view of another embodiment of the input device according to the present disclosure.
Figure 3:
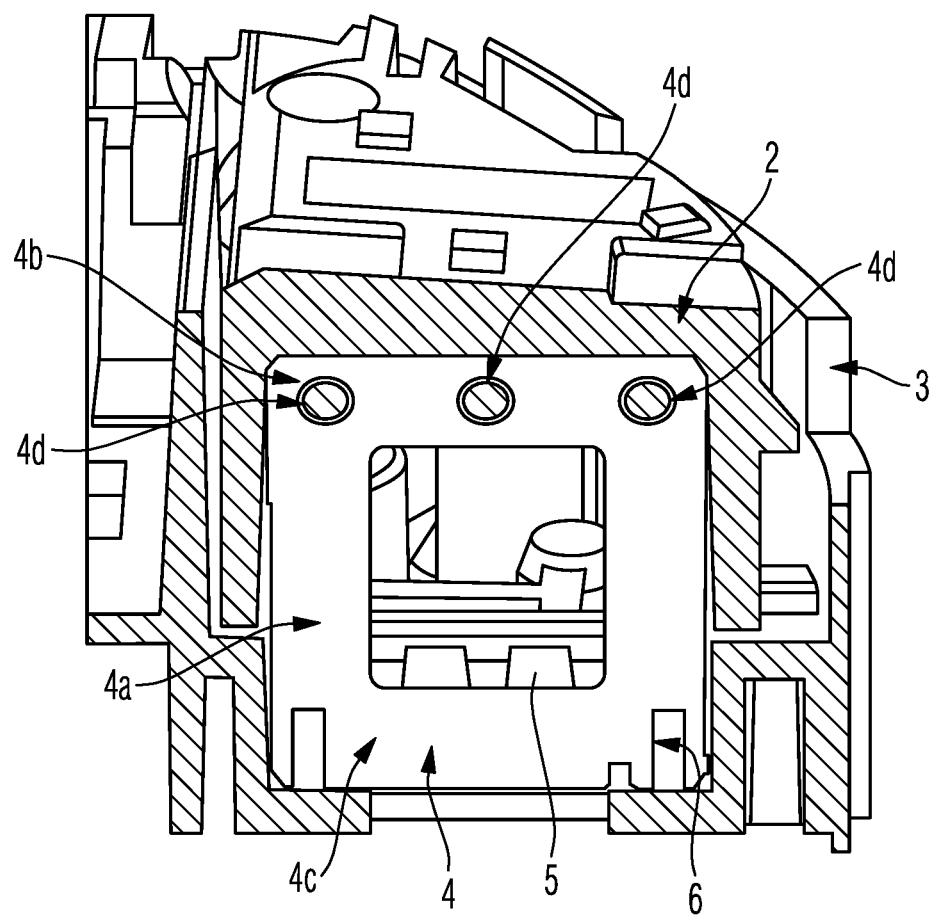
FIG. 3 shows another detailed sectional view of the embodiment from FIG. 2.

FIGS. 2 and 3 show another embodiment of the input device 1 according to the present disclosure that is distinguished by two leaf springs 4 always being connected to each other in the shape of the frame while forming a central aperture, i.e., the first sections 4c and the second sections 4b being connected to each other by a bar. The central aperture serves to latch the first section 4c to the support 3, in that the support-part-side click-in lugs 5 engage in this aperture. At the same time, support bars 6 are provided on the support 3 in order to supportively stabilize the leaf spring elements 4 in the region of the first section 4c and hold them free of play when latched. The second sections 4b are accommodated in a form-fit by overmolding in the base 2b belonging to the operating unit 2. As shown in FIG. 3, the second section 4b of the leaf spring element 4 has apertures 4d that, with overmolding, have been permeated with the molding compound that forms the base 2b, in order to secure the leaf spring elements 4 on both sides.

Figure 4:
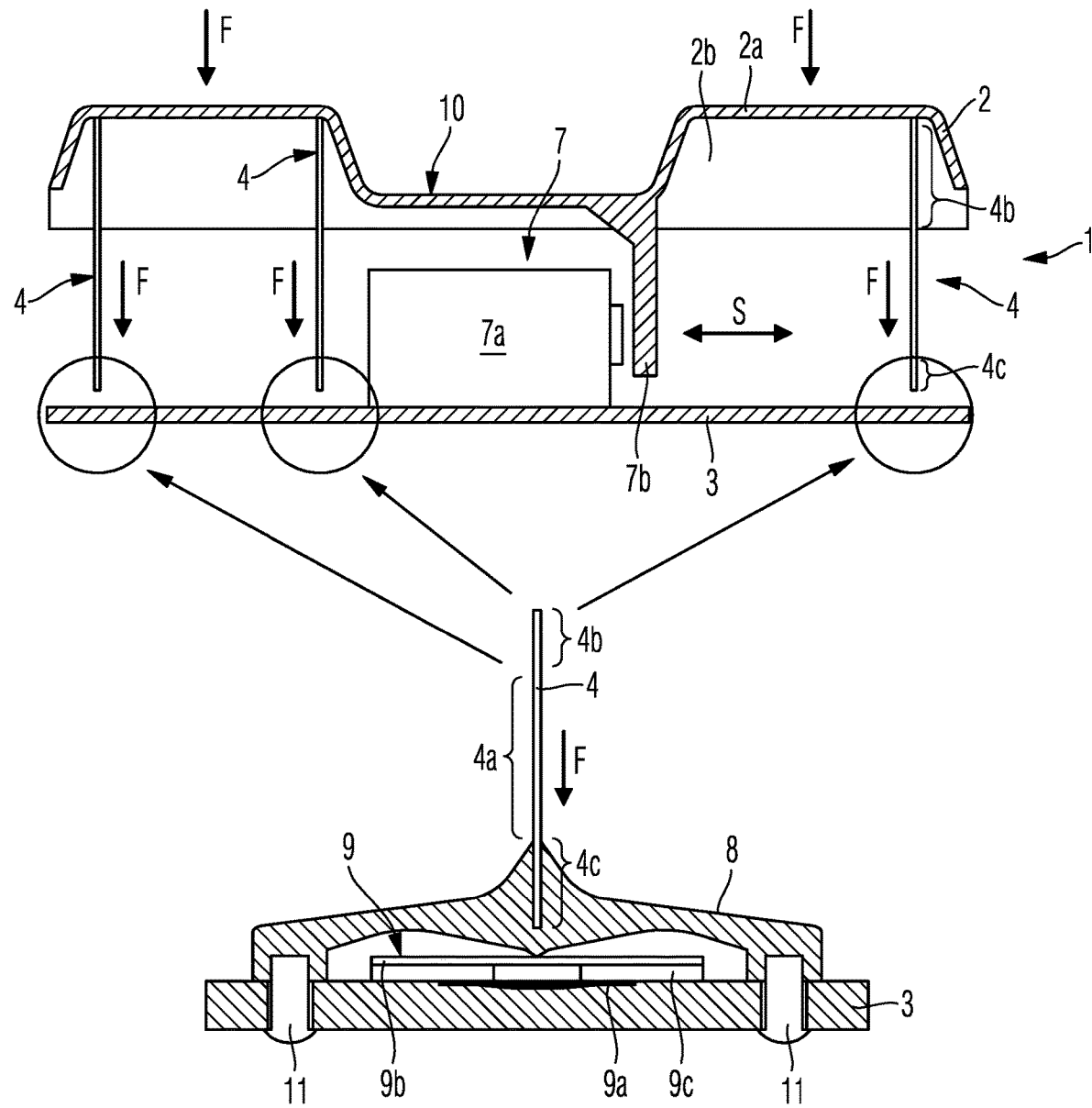
FIG. 4 shows a sectional view of the third embodiment of the input device 1 according to the present disclosure, with an associated detail enlargement.

FIG. 4 shows a third embodiment of the input device 1 according to the present disclosure, with an associated detail enlargement that is distinguished by the leaf springs 4 each being attached to the support 3 by feet 8. This embodiment of the input device 1 has a force sensor 9 for determining an actuating force F acting on the input surface 10. All of the leaf spring elements 4, consisting of spring steel sheet, are, in this case, supported on the support 3 via a foot 8, made of elastic material, that adjoins the first section 4c. For example, the foot 9 is attached to the respective leaf spring element 4 by adhesion or overmolding. The foot 8 is designed like a yoke and overlaps the force sensor 9. The force sensor 9 and foot 8 interact to detect an elastic deformation of the foot 8 caused by the actuating force F. The force sensor 9 is respectively designed as a capacitive force sensor that has an electrode 9a, which generates a measuring capacitance, and a counter electrode 9b, which influences the measuring capacitance, is insulated from the electrode 9a, and forms an intermediate cavity by means of a spacer 9c. The foot 8 is attached by screws 11 to the support 3 or a printed circuit board belonging to the support 3. Under the effect of an actuating force F orthogonal to the actuating surface 10, the foot 8 deforms, which, for its part, acts on the counter electrode 9c to cause a change in the measuring capacitance, which is evaluated by an evaluating unit (not shown), and, when a given change is exceeded, is considered a confirmation of an input made, and is correspondingly communicated to a higher-level data processing apparatus.

Otherwise, the third embodiment also has an operating unit 2 that comprises a base 2b, and a part 2a that is attached to the base 2b and defines the input surface 10.

The operating unit 2 can be displaced in a vibration direction S from the resting position shown in FIG. 4 and is mounted in an elastically restorable manner, wherein an attachment of the operating unit 2 achieved via the upright leaf spring elements 4 is provided. The vibrating and elastically restorable attachment is provided in order to permit vibration to be excited by the actuator 7, for haptic feedback to the user. The actuator 7 comprises an electric coil 7a attached to the support 3 and an armature 7b that magnetically interacts with the coil 7a and is attached to the operating unit 2. The vibrating, restorable mounting is achieved by the several leaf spring elements 4 that consist of stamped spring steel sheet and are arranged parallel to each other. The leaf spring elements 4 as well as the armature 7b are attached to the operating unit 2 by overmolding, in that the base 2b was produced in a molding method by overmolding the leaf spring elements 4, which are arranged in an associated mold cavity of an injection mold, and the armature was produced as a composite part. The second section 4b of the leaf spring element 4 provided for connecting to the operating unit 2 is thereby attached to the operating unit 2 in each case by a form-fit seat, whereas the first section 4c provided for attaching to the support 3 is secured thereto by latching means 5. The first section 4c and second section 4b are connected by a middle section 4a, and all three sections are arranged in the resting position in a common plane that is orthogonal to the input surface 10.

Figure 5:
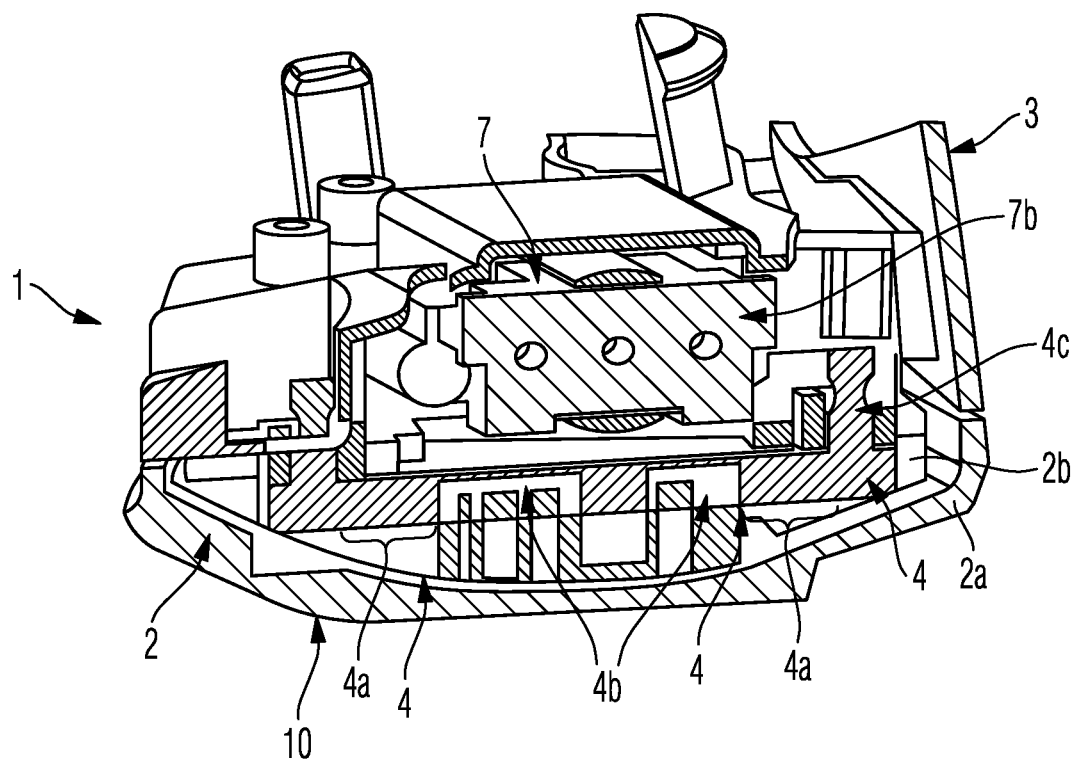
FIG. 5 shows a perspectival sectional view of a fourth embodiment of the input device 1 according to the present disclosure.
Figure 6:
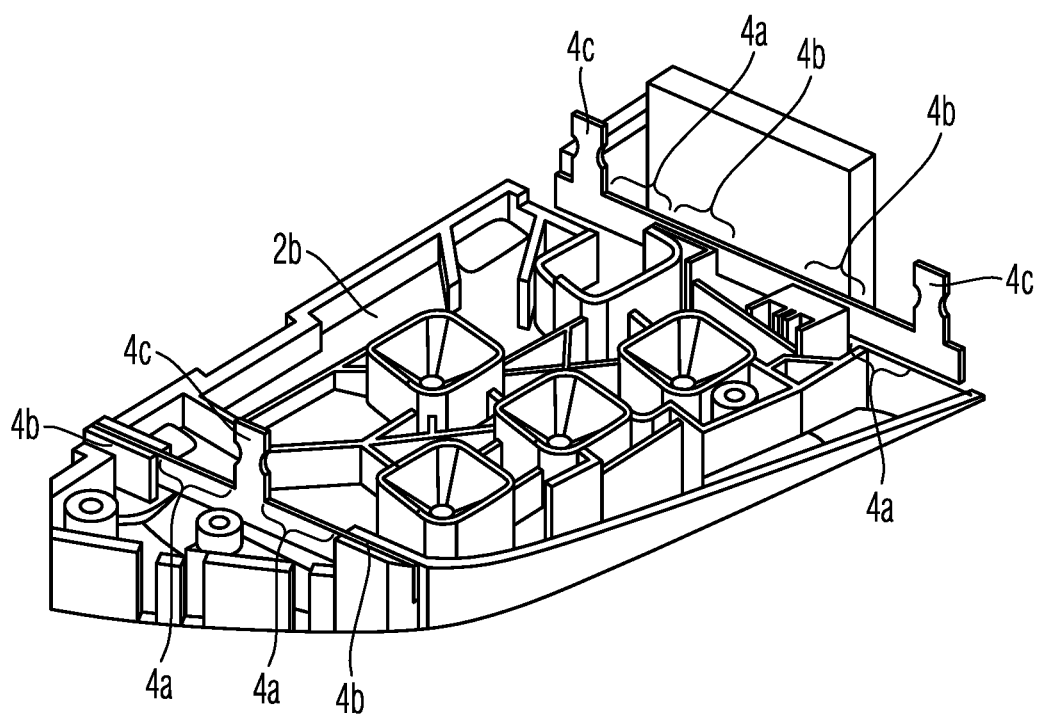
FIG. 6 shows a detailed view of the fourth embodiment of the input device 1 according to the present disclosure.

FIGS. 5 and 6 show a fourth embodiment of the input device 1 according to the present disclosure, with an associated detail enlargement that, as in FIGS. 1 through 3, does not have a force sensor that interacts with the leaf spring elements 4. Because of the particular design of the leaf spring elements 4 made of spring steel, this fourth embodiment forms a particularly space-saving variant. Two of the leaf springs 4 are combined in pairs and are designed substantially as strip-shaped, wherein the middle sections 4a and the second sections 4b are arranged on a common line that is arranged parallel to the input surface 10. The fourth embodiment, as well, has an operating unit 2 that defines a base 2b and a foil 2a that is attached to the base 2b, is equipped with a capacitive touch sensor, and which defines the input surface 10. The operating unit 2 can be displaced from the resting position shown in FIG. 5 and is mounted in an elastically restorable manner, wherein an attachment of the operating unit 2 is provided by several leaf spring elements 4. The vibrating and elastically restorable attachment is provided in order to permit vibration to be excited by the actuator 7, for haptic feedback to the user. The actuator 7 comprises an electric coil that is attached to the support 3, and, in FIG. 5, covered, and an armature 7b that magnetically interacts with the coil and is attached to the operating unit 2. The vibrating, restorable mounting is achieved by the several leaf spring elements 4 of stamped spring steel sheet. As noted above, the leaf springs 4 are integrally combined in pairs. The leaf spring elements 4 as well as the armature 7b are attached to the operating unit 2 by overmolding, in that the base 2b was produced in a molding method by overmolding the leaf spring elements 4, which are arranged in an associated mold cavity of an injection mold, and the armature 7b was produced as a composite part. The second section 4b of the leaf spring element 4 provided for connecting to the operating unit 2 is thereby attached to the operating unit 2 in each case by a form-fit seat, whereas the first section 4c provided for attaching to the support 3 is secured thereto by latching means 5. The first section 4c and second section 4b are connected by a middle section 4a, and all three sections are arranged in the resting position in a common plane that is orthogonal to the input surface 10. Two types of spring elements 4 combined in pairs are provided on the operating unit 2, or its base 2b. A first variant of strip-shaped leaf spring elements 4 has two terminals, first sections 4c with intermediate middle sections 4a, as well as second sections 4b, whereas the other variant has a common first section 4c arranged in the middle, with, relative to this, outer middle sections 4b and second sections 4b. The three first sections 4c accordingly define a three-point attachment of the operating unit 2 on the support 3, in that the first sections 4c are accommodated in corresponding apertures in the support 3 and extend through these apertures, and are secured by rotation in order to secure them in the apertures.

The invention claimed is:

1. A touch-sensitive input detector, comprising:
an operating unit having an input surface and a support;
a fastener for attaching the operating unit to the support in order to mount the operating unit in a vibration direction (S) so as to be displaceable from a resting position and elastically restorable to the resting position;
an actuator for stimulating the operating unit to vibrate in the direction of vibration (S) to provide a haptic feedback, wherein the actuator has a coil and an armature that interacts with the coil, and the armature is accommodated at least partially in a form-fit in the operating unit;
wherein the fastener for attaching the operating unit comprises several leaf spring elements, which each form a first section for attaching to the support and a second section for attaching to the operating unit, and an intermediate middle section, so that the operating unit is mounted on the support in an elastically vibratable manner, and which are arranged at a distance from each other by the middle section, and
wherein at least one section from the first section and the second section is attached by a form-fit seat, such as overmolding, and
wherein the actuator is positioned with one of the several leaf spring elements in a mold cavity and overmolded with a molding compound to form a base of the operating unit.

2. The touch-sensitive input detector of claim 1, wherein the first section, the second section, and the middle section are arranged in a common plane when the operating unit is in the resting position.

3. The touch-sensitive input detector of claim 1, wherein the first section and the second section are each arranged in a plane perpendicular to the touch-sensitive input surface.

4. The touch-sensitive input detector of claim 1, wherein the leaf spring elements are aligned parallel to each other.

5. The touch-sensitive input detector of claim 1, wherein the operating unit is, via the leaf spring elements, mounted so as to be suspended on the support.

6. The touch-sensitive input detector of claim 1, wherein at least one section from first section and second section is attached by a latching means.

7. The touch-sensitive input detector of claim 1, wherein the first section or the second section is arranged so as to extend through an associated aperture, and is secured in the aperture.

8. The touch-sensitive input detector of claim 1, wherein at least two leaf spring elements are integrally formed.

9. The touch-sensitive input detector of claim 8, wherein the two integrally-formed leaf spring elements are designed in the shape of a frame, and the first sections and second sections are each connected by connection sections.

10. The touch-sensitive input detector of claim 8, wherein the two integrally-formed leaf spring elements are designed so that the associated middle sections, in the resting position, are arranged on a common imaginary line.

11. The touch-sensitive input detector of claim 1, with a force sensor for determining an actuating force (F) acting on the input surface, and at least one leaf spring element, via a foot, made of an elastic material, adjoining the first section or second section, is supported on the support or the operating unit, wherein the force sensor and foot interact to detect an elastic deformation of the foot caused by the actuating force (F).

12. The touch-sensitive input detector of claim 1 configured to be installed within a motor vehicle.

13. A method for mounting a touch-sensitive input detector, comprising:
   attaching, using a fastener an operating unit having an input surface to a support in order to mount the operating unit in a vibration direction (S) so as to be displaceable from a resting position and elastically restorable, wherein the fastener for attaching the operating unit comprises a plurality leaf spring elements, which each form a first section for attaching to the support and a second section for attaching to the operating unit, and an intermediate middle section, so that the operating unit is mounted on the support in an elastically vibratable manner, and which are arranged at a distance from each other by the middle section;
   stimulating using an actuator for the operating unit to vibrate in the direction of vibration (S), for a haptic feedback, wherein the actuator has a coil and an armature that interacts with the coil, and, in the overmolding step, an armature belonging to the actuator is overmolded with molding compound;
   overmolding the plurality of leaf spring elements with a molding compound to create a base of the operating unit, such that the second section is attached to the operating unit by a form-fit seat, and overmolding the leaf spring elements with molding compound to create a support, such that the first section is attached to the support by the form-fit seat; and
   mutually attaching of the operating unit, the support, and the actuator,
      wherein the actuator is positioned with one of the plurality of leaf spring elements in a mold cavity and overmolded with the molding compound to form the base of the operating unit.

* * * * *

UNITED STATES PATENT AND TRADEMARK OFFICE
CERTIFICATE OF CORRECTION

PATENT NO. : 10,768,703 B2
APPLICATION NO. : 15/913593
DATED : September 8, 2020
INVENTOR(S) : Benedikt Schmidt, Kai Lang and Mario Schmitt It is certified that error appears in the above-identified patent and that said Letters Patent is hereby corrected as shown below:

In the Claims

Column 8, Lines 20-46, (approx.), should read:
1. A touch-sensitive input detector, comprising:
  an operating unit having an input surface and a support;
  a fastener for attaching the operating unit to the support in order to mount the operating unit in a vibration direction (S) so as to be displaceable from a resting position and elastically restorable to the resting position;
  an armature for stimulating the operating unit to vibrate in the direction of vibration (S) to provide a haptic feedback, wherein the armature has a coil and an armature that interacts with the coil, and the armature is accommodated at least partially in a form-fit in the operating unit;
  wherein the fastener for attaching the operating unit comprises several leaf spring elements, which each form a first section for attaching to the support and a second section for attaching to the operating unit, and an intermediate middle section, so that the operating unit is mounted on the support in an elastically vibratable manner, and which are arranged at a distance from each other by the middle section, and
  wherein at least one section from first section and second section is attached by a form-fit seat, such as overmolding.

Column 9, Line 19-Column 10, Line 21, (approx.), should read:
13. A method for mounting a touch-sensitive input detector, comprising:
  attaching, using a fastener an operating unit having an input surface to a support in order to mount the operating unit in a vibration direction (S) so as to be displaceable from a resting position and elastically restorable;
  wherein the fastener for attaching the operating unit comprises a plurality leaf spring elements, which each form a first section for attaching to the support and a second section for attaching to the operating unit, and an intermediate middle section, so that the operating unit is mounted on the support in an elastically vibratable manner, and which are arranged at a distance from each other by the middle section;

Signed and Sealed this
Tenth Day of November, 2020

Andrei Iancu
*Director of the United States Patent and Trademark Office* stimulating using an armature for the operating unit to vibrate in the direction of vibration (S), for a haptic feedback, wherein the armature has a coil and an armature that interacts with the coil, and, in the overmolding step, an armature belonging to the armature is overmolded with molding compound;

overmolding the plurality of leaf spring elements with a molding compound to create a base of the operating unit, such that a second section is attached to the operating unit by a form-fit seat, overmolding the leaf spring elements with molding compound to create a support, such that a first section is attached to the support by the form-fit seat;

mutually attaching of the operating unit, the support, and the armature.